Jan. 23, 1951 K. C. D. HICKMAN 2,538,967
VACUUM DISTILLATION APPARATUS
Filed Jan. 10, 1945 3 Sheets-Sheet 1

KENNETH C. D. HICKMAN
INVENTOR

BY Warren H. Cannon
ATTORNEY

Jan. 23, 1951  K. C. D. HICKMAN  2,538,967
VACUUM DISTILLATION APPARATUS
Filed Jan. 10, 1945 3 Sheets-Sheet 2

KENNETH C.D. HICKMAN
INVENTOR

BY Warren H. Cannon
ATTORNEY

Jan. 23, 1951  K. C. D. HICKMAN  2,538,967
VACUUM DISTILLATION APPARATUS
Filed Jan. 10, 1945  3 Sheets-Sheet 3

KENNETH C.D. HICKMAN
INVENTOR

BY Warren H. Cannon
ATTORNEY

Patented Jan. 23, 1951

2,538,967

UNITED STATES PATENT OFFICE 2,538,967

VACUUM DISTILLATION APPARATUS

Kenneth C. D. Hickman, Rochester, N. Y., assignor, by mesne assignments, to Eastman Kodak Company, Rochester, N. Y., a corporation of New Jersey Application January 10, 1945, Serial No. 572,199

4 Claims. (Cl. 202—205)

This invention relates to improved high-vacuum distillation process and apparatus.

The fundamental drawback in existing high-vacuum unobstructed path stills is that heat is applied to one side of the vaporizing surface and is lost by distillation and radiation from the other side of the vaporizing surface. There is thus a heat gradiant throughout the layer or film of distilland on the vaporizing surface. This means that excess heat must be applied to the vaporizing surface and to the film of distilland adjacent thereto in order to heat the active distilling surface of the distilland to distillation temperature. The surface of the distilland adjacent the vaporizing surface is thus overheated and the active distilling surface is under heated. This results in thermal decomposition, poor heat efficiency, and rapid deposition of solids on the vaporizing surface.

This invention has for its object to alleviate the foregoing difficulties. Another object is to provide improved high-vacuum, unobstructed path distillation process and apparatus in which thermal decomposition, due to overheating of the part of the distilling film adjacent the vaporizing surface, is largely avoided. Another object is to provide improved high-vacuum, unobstructed path distillation apparatus in which heat losses are reduced. Another object is to improve the state of the art. Other objects will appear hereinafter.

These and other objects are accomplished by my invention which includes high-vacuum, unobstructed path distillation process and apparatus in which the active distilling surface of the distilland is directly heated by a radiant heater so positioned and/or so constructed that harmful contact between the radiant heater and the distilling vapors is largely prevented.

In the following description I have set forth several of the preferred embodiments of my invention, but it is to be understood that they are given by way of illustration and not in limitation thereof.

In the accompanying drawings wherein like numbers refer to like parts:

Figure 1:
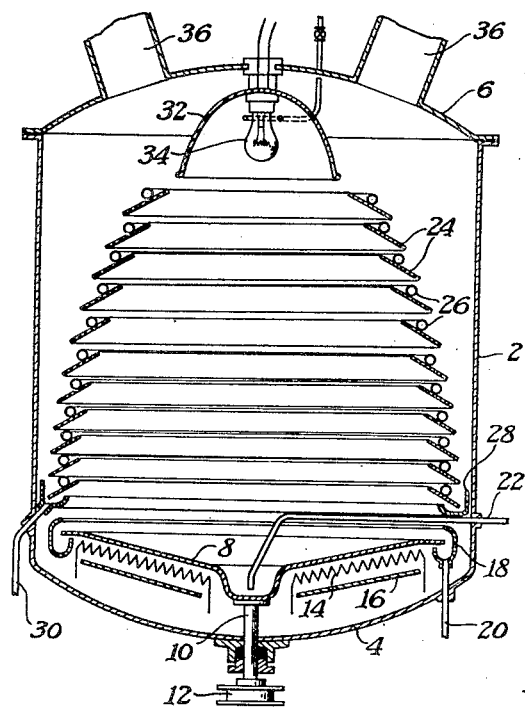
Fig. 1 is a vertical section of a still embodying the features of my invention, which still is provided with a baffle-type condenser and a radiant heater suitably positioned and focused to direct the rays practically entirely onto the distilling film.

Referring to Fig. 1, numeral 2 designates a cylindrical still casing provided with an integral end plate 4 and a removable cover 6 which cooperate to form a gastight distilling receptacle. Numeral 8 designates a circular vaporizing surface rotatably mounted upon shaft 10 and driven by pulley 12. Numeral 14 designates a heating element, and numeral 16 a reflector or insulating baffle serving to prevent loss of heat. Numeral 18 designates an annular gutter surrounding the periphery of plate 8 to which is connected a withdrawal conduit 20. Numeral 22 designates a conduit for introducing distilland onto the approximate center of vaporizing plate 8.

Numeral 24 designates a plurality of annular collars which are cooled by cooling coil 26 and which cooperate to form a condensing surface. Numeral 28 designates an annular gutter positioned immediately below the lowermost condensing baffle 24 to which is connected withdrawal conduit 30. Numeral 32 designates a reflector in which is positioned a radiant heater filament 34 which is preferably provided with an envelope which is transparent to heat. Numeral 36 designates withdrawal conduits connected to evacuating pumps (not shown).

Figure 3:
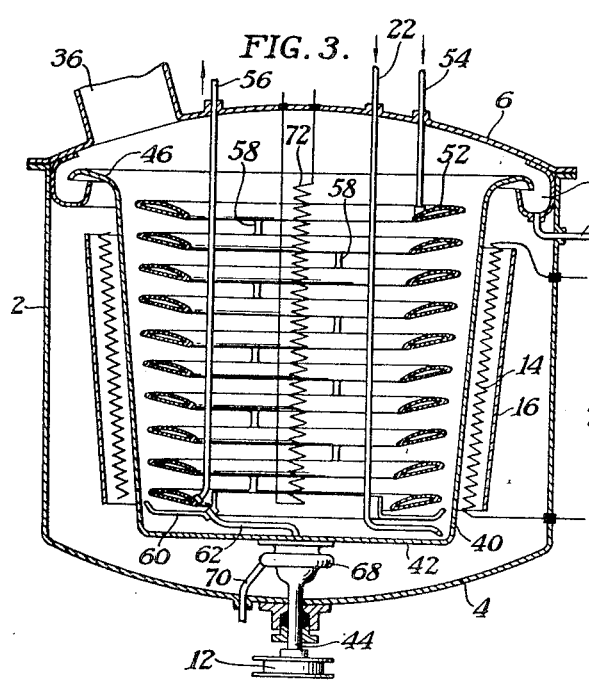
Fig. 3 is a vertical section of a further modification of the apparatus illustrated in Fig. 1.
Figure 5:
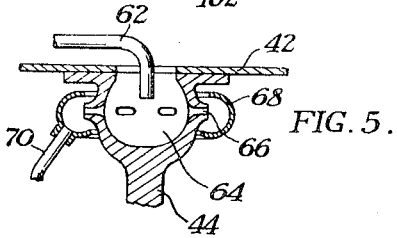
Fig. 5 is a fragmentary enlargement partially in section of the means shown in Fig. 3 for withdrawing condensate from the inside of the still.

Referring to Figs. 3 and 5, numeral 40 designates a truncated cone integral with a plate 42 and rotatably mounted upon shaft 44. The truncated cone 40 serves as a vaporizing surface and the upper, outwardly extended lip 46 thereof protrudes in an annular gutter 48 connected to withdrawal conduit 50. Numeral 52 designates a plurality of annular hollow members positioned inside vaporizing surface 40 and serving as a baffle-type condensing surface. Cooling fluid is circulated through the baffles 52 by introduction through conduit 54 and removed through conduit 56. Numeral 58 designates a plurality of conduits which maintain the condenser baffles 52 in the position shown and which serve to permit cooling fluid to flow from one baffle into the next lowest baffle. Numeral 60 designates an annular gutter immediately below the lowermost baffle 52 to which is connected withdrawal conduit 62, the lower end of which conduit protrudes into the hollow upper end 64 of shaft 44.

Shaft 44 is provided with a plurality of nozzles 66 which communicate with the inside hollow portion 64 and which protrude into annular gutter 68 surrounding the outside thereof. Numeral 70 designates a conduit connected to annular gutter 68. Numeral 72 designates a radiant heater positioned at approximately the center of rotating cone 40.

Figure 4:
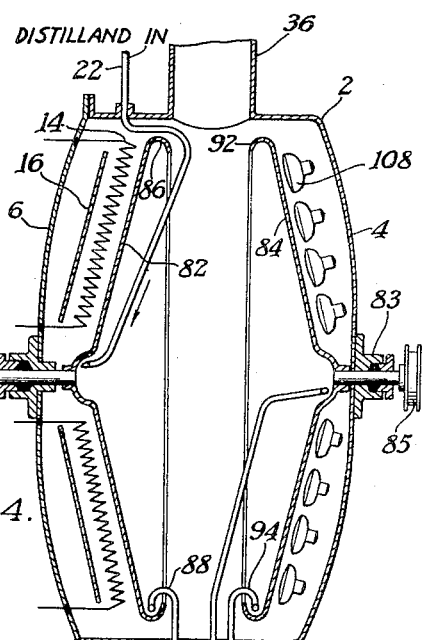
Fig. 4 is a vertical section of a still having a transparent condenser.

Referring to Fig. 4, numeral 80 designates a shaft upon which is carried a rotatable vaporizing surface 82 and numeral 83 a shaft carrying a transparent rotatable condensing surface 84. Vaporizing surface 82 has an inwardly turned lip 86 into which protrudes a pickup device 88 connected to withdrawal conduit 90. Numeral 92 designates an inwardly turned edge at the periphery of condensing surface 84 which forms an annular gutter and into which protrudes a pickup device 94 connected to withdrawal conduit 96 which leads to a cooler 98 provided with a bleed off 100 for removal of distillate and with a conduit 102 connected to circulating pump 104. Numeral 106 designates a conduit connected to the exhaust side of pump 104 and terminating at the center of condensing surface 84. Numeral 108 designates a plurality of radiant heaters positioned behind the condensing surface 84 and directing their rays toward the vaporizing surface 82.

Figure 7:
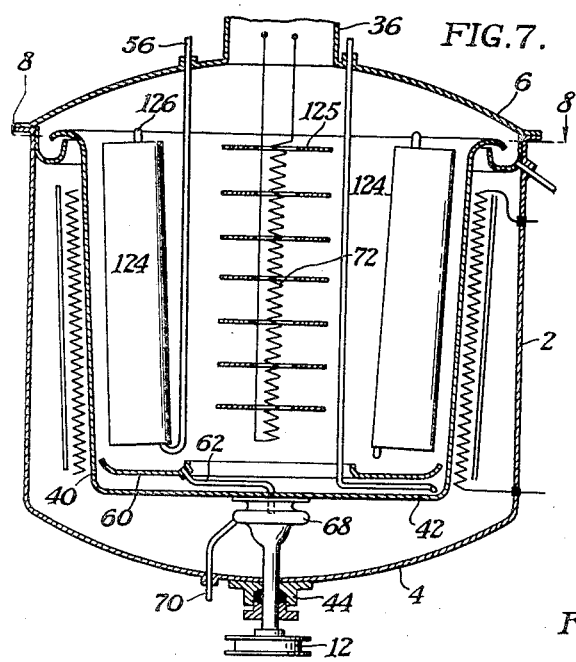
Fig. 7 is a vertical section of a still having a vertical lattice condenser.
Figure 8:
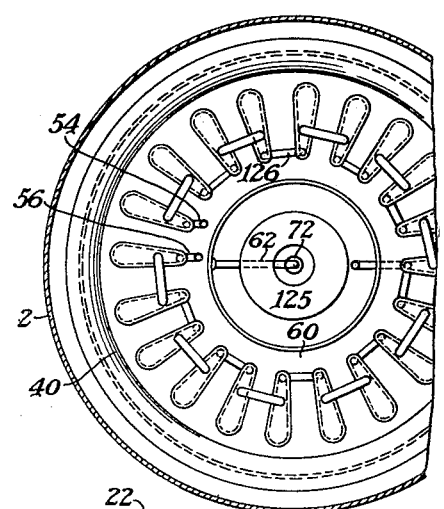
Fig. 8 is a horizontal section taken on line 8—8 of Fig. 7.

Referring to Figs. 7 and 8, numeral 124 designates a plurality of hollow lattices vertically arranged to form a lattice-type condenser which are connected together by conduits 126 and through which cooling fluid is circulated by introduction through conduit 56 and withdrawal through conduit 54. Numeral 125 designates a plurality of polished baffles or reflectors positioned about radiant heater 72 at spaced intervals as illustrated.

Figure 9:
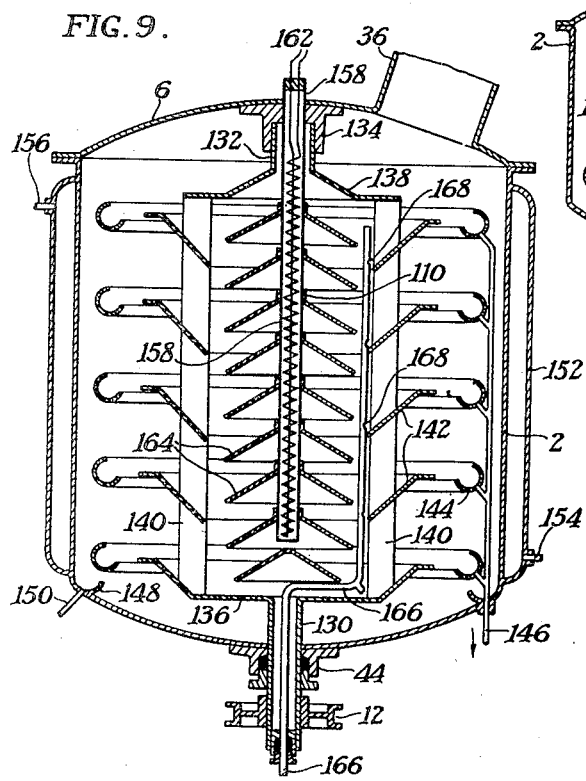
Fig. 9 is a vertical section of a still in which the condensing surface surrounds a vaporizing surface formed of a plurality of truncated cones.

Referring to Fig. 9, numerals 130 and 132 designate shafts housed in bearings 44 and 134 respectively, which are integral with end plates 136 and 138 respectively. These end plates are connected into one integral unit by supporting knife edges 140. Upon these knife edges are mounted at regular intervals, truncated conical vaporizing surfaces 142, the outer edge of each of which protrudes into withdrawal gutters 144, which are connected to withdrawal conduit 146. Numeral 148 designates a gutter positioned at the base of cylindrical casing 2 to which is connected a withdrawal conduit 150. Numeral 152 designates a jacket surrounding casing 2 through which cooling fluid is circulated by introduction through conduit 154 and removal through conduit 156.

Numeral 158 designates a rigid heating element which is stationarily mounted upon cover 6 in the manner indicated. The heating element is provided with an internal electrical heating element 162. Numeral 164 designates a plurality of reflectors which are likewise stationary and which are mounted upon the heating element 158 so as to reflect the heat directly onto the upper surface of vaporizing truncated cones 142. Numeral 166 designates a conduit for the introduction of distilland onto the vaporizing cones 142. This conduit is provided with a plurality of openings 168 which are opposite the lower portion of the conical vaporizing surfaces.

Figure 10:
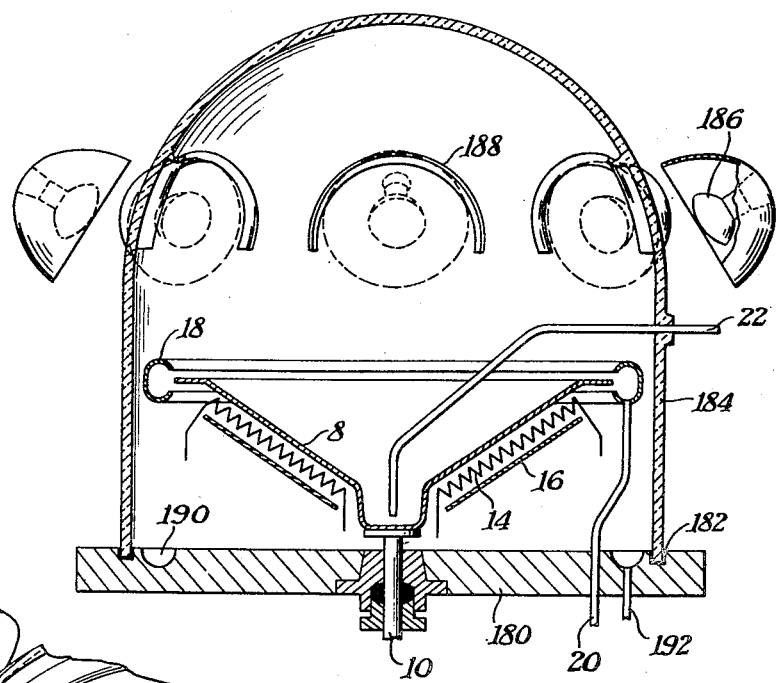
Fig. 10 is a vertical section showing the use of a transparent stationary condenser and external radiant heaters.
Figure 11:
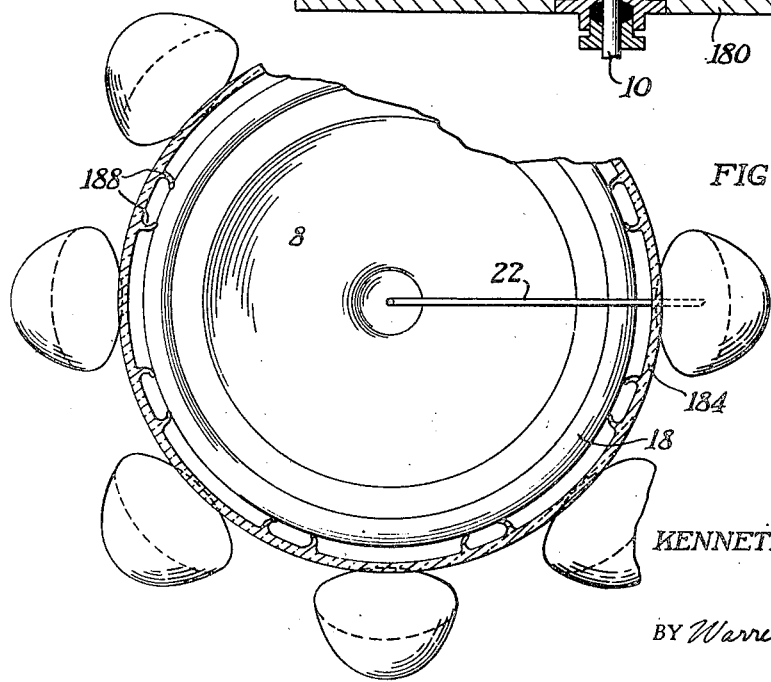
Fig. 11 is a top plan view of the apparatus shown in Fig. 10.

Referring to Figs. 10 and 11, numeral 180 designates a rigid base provided with an annular groove 182 in which is seated, in a gas-tight manner, a dome 184 which is transparent to infra-red rays, at least in the portions opposite radiant heaters 186. Numeral 188 designates semi-circular gutters which are mounted upon the inside upper surface of dome 184 at the top of the portions opposite radiant heaters 186. Numeral 190 designates an annular groove formed in the base 180 which is connected with withdrawal conduit 192.

In operating the apparatus illustrated in Fig. 1, the system is evacuated through conduits 36. Vaporizing surface 8 is rotated by force applied to pulley 12 and heater 14 is put into operation so as to partially heat the vaporizing surface 8. Distilland preferably in degassed condition is introduced onto the center of plate 8 by way of conduit 22. Cooling fluid is circulated through conduit 26 so as to cool condensing baffles 24 and radiant heater 34 is put into operation. Distilland is caused to flow by centrifugal force and in the form of a thin film over vaporizing surface 8 and undistilled residue is thrown into gutter 18 and is removed through conduit 20. Vapors formed during passage of the film of distilland over vaporizing surface 8 comes into contact with cooling baffles 24 and are condensed thereon. The liquid condensate is then shed from the upper baffle to the next lower baffle and finally drains or drops into gutter 28 and is withdrawn from the still through conduit 30. Radiant heater 34 is adjusted so that the radiant heat is focused on the vaporizing surface 8 but so that little of the radiant heat falls on condensing baffles 24. The radiant heat is picked up by the film of distilland and the active distilling surface is thus heated to distillation temperature. All of the heat required for the distillation could thus be applied to the active distilling surface. However, it is preferred that the vaporizing surface be at least partially heated by heater 14.

In operating the apparatus illustrated in Figs. 3 and 5, vaporizing surface 40 is rotated as previously described, heating element 14 is put into operation and cooling fluid is circulated through conduits 54 and 56. Radiant heater 72 is put into operation. Distilland, preferably in degassed condition, is introduced through conduit 22. This distilland is caused to flow upwardly over the inside surface 40 in the form of a thin film and is then thrown into gutter 48. The undistilled residue is removed through conduit 50. Radiant heat from 72 passes between the condensing baffles 52 and directly falls onto the active surface of the distilling film climbing the wall of 40, and thus the radiant heat is applied where it will do the most good. Vapors are condensed on condensing baffles 52 and flow or drop from an upper baffle to the next lower baffle and finally into gutter 60. The condensate then flows through conduit 62 into the upper hollow portion of shaft 44 and is thrown by centrifugal force into gutter 68. This condensate is then withdrawn from the still through conduit 70.

In operating the apparatus shown in Fig. 4, shaft 80 and vaporizing surfaces 82 and shaft 83 and condensing surface 84 are rotated by force applied to pulleys 12 and 85. Heater 14 is put into operation and radiant heaters 108 are caused to radiate heat. Condensing surface 84 is of a material which is substantially transparent to radiant heat. Therefore, the radiant heat passes through condenser 84 and is picked up by the film of distilland on vaporizing surface 82. Undistilled residue from the vaporizing surface collects in gutter 86 and is thrown into pickup device 88 and withdrawn through conduit 90. Condensate is similarly thrown into gutter 92 of condenser 84, is thrown into pickup device 94 and flows thence into cooler 98. Part of the condensate is continuously bled off through conduit 100, the remainder is circulated by pump 104 back over the surface of 84 and thus serves to maintain 84 in cooling condition. Surface 84 preferably rotates at high speed so that the condensate is maintained in a very thin film and thus prevented from substantially absorbing radiant heat. On the other hand, vaporizing surface 82 is preferably rotated at a lower speed and thus picks up the radiant heat on the thicker film of distilland.

The operation of the apparatus illustrated in Figs. 7 and 8 is much the same as that described in connection with Fig. 3, the vapors passing to and condensing upon the lattice condenser elements 124, draining into gutters 60 etc. The gases readily pass through the spaces between elements 124 and are removed by the pumps (not shown) attached to 36. End loss of radiant heat is avoided by polished reflectors or baffles 125 which are positioned so as to reflect the heat toward the vaporizing surface 40.

In operating the apparatus illustrated in Fig. 9, cooling fluid is circulated through jacket 152 and conduits 154 and 156. Force is applied to pulley 12 to rotate shafts 130 and 132, knife edges 140, and truncated conical vaporizing surfaces 142 as one integral unit. Radiant heater 158 is put into operation by supplying electric current to the leads of element 162. Distilland is introduced through conduit 166 and caused to flow onto the vaporizing plates 142 through openings 168. Due to centrifugal force this distilland is distributed on each of these vaporizing surfaces in a thin film and undistilled residue is thrown into gutters 144 and removed through conduit 146. During passage over the vaporizing surfaces 142, the film is directly heated by radiant heat which is derived from radiant heater 158 and baffles 164. Vapors given off are condensed upon the cold inside surface of casing 2, flow by gravity into gutter 148, and are removed through conduit 150. The centrifugal force imparted to the vapors causes them to pass toward the outside wall and to impinge upon the surface of casing 2. Contact with radiant heater 158 is thus avoided to a large extent. The positioning of reflectors 164 and of the vaporizing surfaces 142 prevent any material loss of radiant heat. Thus, the heat is directed onto the distilling film and is thus prevented from impinging on the condensing surface. This construction has the further advantage that the vaporizing surfaces are so positioned that heat is radiated from one to the other while little or no heat is lost by reflection to a nearby condensing surface as in ordinary molecular still constructions. In other words, the still shown in Fig. 9 is self-radiating on the vaporizing surface. This surface is emitting radiation toward the center of the still and toward the rim above it, but the center of the still is at its own temperature so that no heat is lost. Elements 136 and 138 may be polished so as to prevent further loss of heat from the central portion of the still.

In operating the apparatus illustrated in Figs. 10 and 11 vaporizing surface 8 is heated and caused to rotate as described in connection with Fig. 1, etc. Distilland is introduced through conduit 22, is caused to flow in a thin film over 8 and undistilled residue is thrown into guter 18 and removed through conduit 20. Vapors condense upon the inside wall of dome 184 which is here cooled. Condensate flows into groove 190 and is removed through conduit 192. Due to the centrifugal force applied to the vapors, most of them are condensed on the lower part of dome 184. Those small portions of the vapor which condense on the upper part of the domes are directed away from the heat transparent portions of the dome by gutters 188. Heat from radiant heaters 186 passes through wall of dome 184 and is directed onto the distilling film held on the surface of rotating plate 8.

Figure 2:
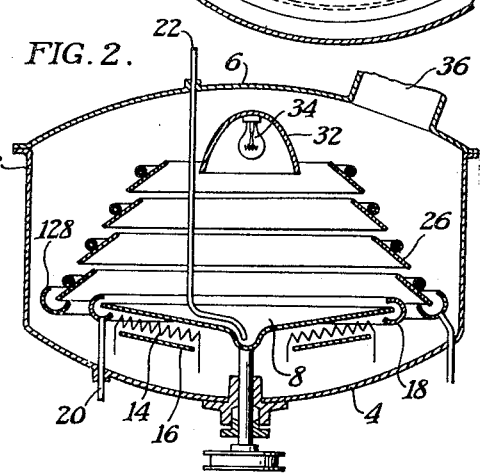
Fig. 2 is a vertical section of a modification of the apparatus shown in Fig. 1.

Referring to Fig. 2, condensing elements 26 are positioned toward the outer periphery of vaporizing surface 8 so that the centrifugal force imparted to the vapors will cause them to impinge upon the condensing elements in a more positive manner than would take place in the construction shown in Fig. 1. The construction and operation of the apparatus illustrated in Fig. 2 is otherwise the same as that described in connection with Fig. 1. It is to be noted that with such a construction the vapors are caused to flow toward the periphery and the central portion of the apparatus would be largely free of vapors, so that little difficulty would be encountered with contact of the vapors with the radiant heater 34. Harmful contact could also be prevented by using a heat transparent envelope such as quartz, the envelope remaining below decomposition temperature so that vapors contacting therewith are not destroyed. This contact can be reduced further by means of a controlled leak such as shown in Fig. 1.

Figure 6:
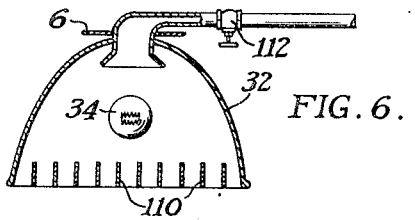
Fig. 6 is a fragmentary sketch illustrating a modification of the radiant heater shown in Fig. 1.

In a modification shown in Fig. 6 a plurality of baffles 110 are positioned in front of the radiant heater to prevent contact between vapors and the heater. A controlled leak 112 may be used to permit continuous introduction of small amounts of a gas (preferably inert) which blows from the radiant heater toward the vaporizing surface and thus prevents contact between the heater and the vapors.

It will be noted that in several of the figures I have illustrated the possibility of using both a transparent envelope or transparent aperture for permitting radiant heat to pass to the vaporizing surface and for preventing contact of vapors with the radiant heaters; also positioning of the radiant heaters so that the vapors cannot come into contact therewith to a harmful extent; also, that the radiant heaters may be constructed with baffles to prevent harmful contact between the radiant heaters and the vapors. All these expedients need not be used simultaneously and my invention includes the use of any single expedient, as well as any combination thereof.

Many modifications can be made in the illustrated apparatus without departing from the spirit or scope of my invention. Thus, while I have illustrated the preferred embodiment of my invention involving the use of centrifugal surfaces, the invention is equally applicable to gravity-flow types of apparatus. Infrared filament lamps, tungsten arcs, bare or enclosed, electrically warmed Nichrome wire, "Glowbar" heaters, etc., may be used as a source of the radiant heat.

What I claim is:

1. High-vacuum, unobstructed path distillation apparatus comprising in combination a rotatable vaporizing surface over which distilland flows in a thin film by centrifugal force, means for heating the vaporizing surface, means for introducing distilland onto the vaporizing surface, means for removing undistilled residue from the vaporizing surface, a rotatable condensing surface which is substantially transparent to infrared radiation which is separated from the vaporizing surface by substantially unobstructed space and which is adapted to cause condensate to flow thereover in a thin film by centrifugal force, means for cooling the transparent condensing surface, means for removing condensate from the transparent condensing surface, means for maintaining a film of condensate on the condensing surface of such tenuation that it absorbs relatively little radiant heat, a source of radiant heat positioned so that the transparent condensing surface is between the vaporizing surface and the source of radiant heat and so that the radiant heat is directed through the condensing surface and onto the film of distilland carried by the vaporizing surface.

2. High-vacuum, unobstructed path distillation apparatus comprising in combination a rotary evaporator having a concave vaporizing surface over which distilland flows in a thin film and from which vapors are distilled in a directed path, means for heating the vaporizing surface, means for introducing distilland onto the vaporizing surface, means for removing undistilled residue from the vaporizing surface, a radiant heater positioned for directing radiant heat against said vaporizing surface and disposed in the directed path of the distilling vapors, a lattice-type baffle condenser separated from the vaporizing surface by substantially unobstructed space and positioned in the directed path of the distilling vapors between the vaporizing surface and the radiant heater so as to permit radiant heat to pass therethrough to the vaporizing surface, means for cooling the baffle condenser and means for removing condensate from the baffle condenser.

3. In vacuum distillation apparatus, a rotary evaporator, radiant heating means for supplying heat to said evaporator, and condensing means for condensing vapors distilled from said evaporator, said rotary evaporator having a generally concave evaporating surface for distilling vapors and projecting said vapors outwardly from said surface in a directed path in the direction of said radiant heating means, said radiant heating means being spaced from said evaporating surface and being constructed and arranged to direct heat radiation against said surface, said condensing means being disposed along said directed path at a zone along said path between said evaporating surface and said radiant heating means and being separated from said evaporating surface by unobstructed space, said condensing means being constructed and arranged to permit passage of heat radiation from said radiant heating means to said evaporating surface.

4. Vacuum distillation apparatus comprising in combination a gas-tight chamber, evacuating means for said chamber, a rotary evaporator disposed in said chamber and having a generally concave vaporizing surface for distilling vapors and directionally projecting said vapors along a directed path outwardly from said surface, condensing means spaced from said vaporizing surface and positioned along said directed path to intercept vapors projected from said surface, an infra-red radiation source separated from said vaporizing surface by said condensing means, said condensing means comprising a plurality of spaced-apart condensing elements permitting passage of infra-red radiation therebetween from said radiation source to said vaporizing surface, and means for introducing distilland on said vaporizing surface and means for removing condensate from said condensing means.

KENNETH C. D. HICKMAN.

REFERENCES CITED

The following references are of record in the file of this patent:

UNITED STATES PATENTS

| Number | Name | Date |
|---|---|---|
| 1,881,041 | Benjamin | Oct. 4, 1932 |
| 2,210,927 | Hickman | Aug. 13, 1940 |
| 2,308,008 | Hickman | Jan. 12, 1943 |
| 2,343,666 | Hickman | Mar. 7, 1944 |
| 2,370,462 | Hecker | Feb. 27, 1945 |
| 2,370,464 | Hickman | Feb. 27, 1945 |
| 2,379,151 | Hickman | June 26, 1945 |
| 2,405,877 | Delano | Aug. 13, 1946 |
| 2,427,718 | Denys | Sept. 23, 1947 |